(12) United States Patent
Beadle et al.

(10) Patent No.: US 6,339,829 B1
(45) Date of Patent: Jan. 15, 2002

(54) METHOD AND APPARATUS TO STORE EXTENDED SECURITY INFORMATION IN A DATA STRUCTURE WHICH SHADOWS A JAVA CLASS OBJECT

(75) Inventors: Bruce Anthony Beadle, Round Rock; Michael Wayne Brown, Georgetown; Leonard Robert Nizinski, Jr.; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/126,682

(22) Filed: Jul. 30, 1998

(51) Int. Cl.[7] .............................................. G06F 9/45
(52) U.S. Cl. ........................................ 713/201; 717/11
(58) Field of Search ................................ 713/200, 201, 713/176, 167, 191; 709/313, 315, 316; 711/216; 707/103, 103 R, 103 Y, 103 Z; 717/11

(56) References Cited

U.S. PATENT DOCUMENTS 5,694,569 A * 12/1997 Fischer ........................ 711/216
5,727,145 A * 3/1998 Nessett et al. ............... 713/200
5,748,960 A * 5/1998 Fischer ........................ 709/316
5,958,050 A * 9/1999 Griffin et al. ................ 713/200
6,092,194 A * 7/2000 Touboul ...................... 713/200
6,105,072 A * 7/2000 Fischer ........................ 709/315
6,154,844 A * 11/2000 Touboul et al. .............. 713/201
6,230,184 B1 * 5/2001 White et al. ................. 709/201
6,272,677 B1 * 8/2001 Lam et al. ..................... 717/11

OTHER PUBLICATIONS

Lindholm et al, "The Java Virtual Machine Specification", Sun Microsystems, Inc., Sep. 1996, pp. 83–89.*

* cited by examiner

*Primary Examiner*—Gail Hayes
*Assistant Examiner*—Christopher Revak
(74) *Attorney, Agent, or Firm*—Duke W. Yee; Jeffrey S. LaBaw; Stephen J. Walder, Jr.

(57) ABSTRACT

The present invention modifies the implementation of the Netscape security model to use an apparatus to set and get extended class data. More specifically, use of the apparatus to store the additional security information for later retrieval at the point where this information would have been written into the Java class data structure, and retrieve this information at the point it would have been read from the Java class data structure. The apparatus is implemented by creating a hash table of objects that store the extended class information. The hash key function uses the original class reference to lookup the classes shadow data structure.

19 Claims, 4 Drawing Sheets

METHOD AND APPARATUS TO STORE EXTENDED SECURITY INFORMATION IN A DATA STRUCTURE WHICH SHADOWS A JAVA CLASS OBJECT

BACKGROUND OF THE INVENTION

1. Technical Field

The present invention relates to both a method and an apparatus for decoupling a Java Virtual Machine (JVM) from an internet browser. Specifically, the system involves the storage of extended security information in a data structure that shadows a Java class object.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

Many currently available web browsers, such Netscape Communicator, which is available from Netscape Communications Corporation, incorporate JVMs as part of the web browser. Presently, however, JVMs updates are provided more often than web browser updates. Such a situation prevents users from taking advantage of improved versions of WMs until the web browser is updated. Therefore, it would be advantageous to have an improved method and apparatus for providing users an ability to use more recent versions of JVMs without having to wait for an updated version of the web browser. However, Netscape redefined the JVM's internal (non-overrideable and non-replaceable) class data structure to include additional security information. Specifically, Netscape added their certificate model called "ziggy" to this internal structure. While this works as an implementation, a change to the internals of a JVM to store additional security information breaks the security capabilities. Therefore, to provide the required Netscape security capabilities, an alternative design is needed.

SUMMARY OF THE INVENTION

The present invention modifies the implementation of the Netscape security model to use an apparatus to set and get extended class data. More specifically, use of the apparatus to store the additional security information for later retrieval at the point where this information would have been written into the Java class data structure, and retrieve this information at the point it would have been read from the Java class data structure. The apparatus is implemented by creating a hash table of objects that store the extended class information. The hash key function uses the original class reference to lookup the classes shadow data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with accompanying drawings, wherein:

DETAILED DESCRIPTION OF THE PREFERRED EMBODIMENT

Figure 1:
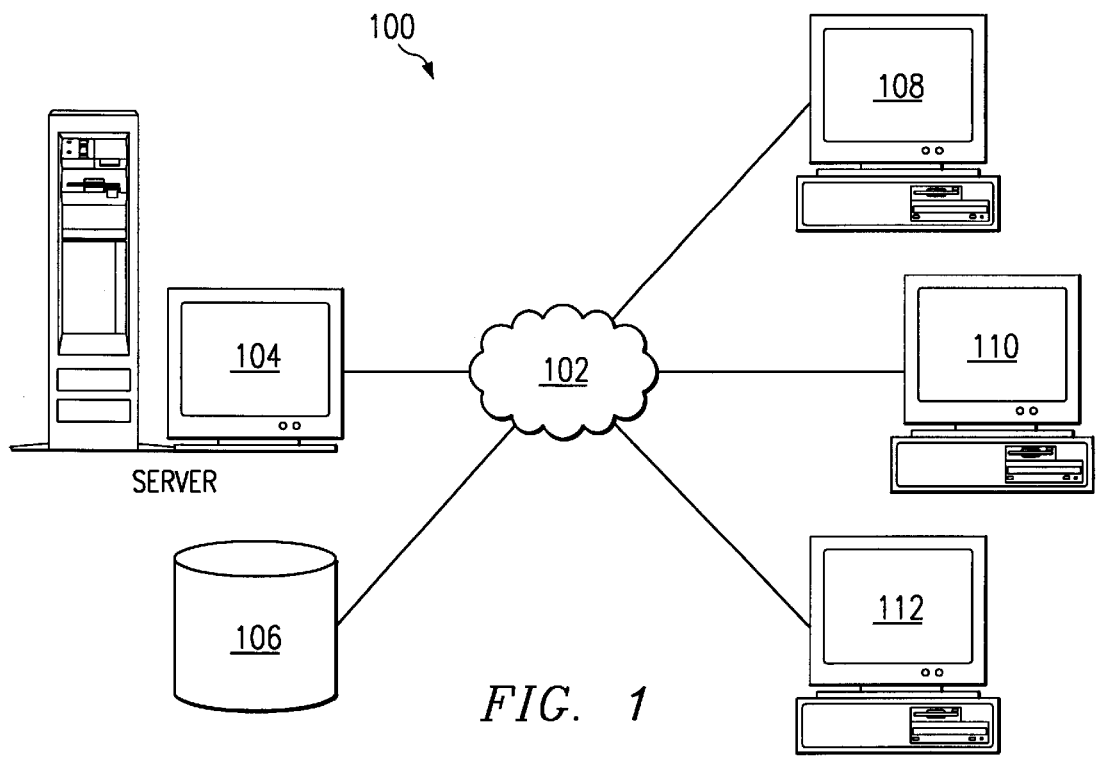
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers of network computers. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, clients, and other devices not shown. FIG. 1 is intended as an example, and not as an architectural limitation for the processes of the present invention.

Figure 2:
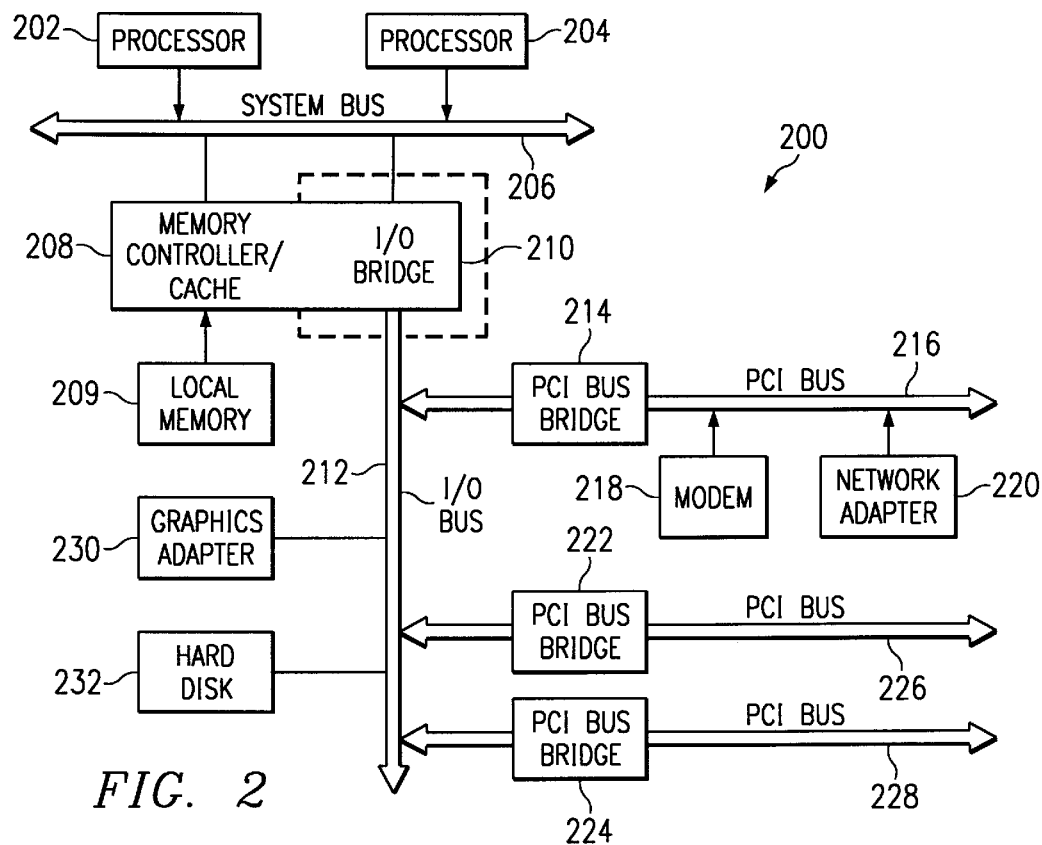
FIG. 2 is a block diagram of a data processing system that may be implemented as a server.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller-cache 208, which provides an interface to local memory 209. I/O bus bridge 210 is connected to system bus 206 and provides an interface to I/O bus 212. Memory controller-cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to 10 bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
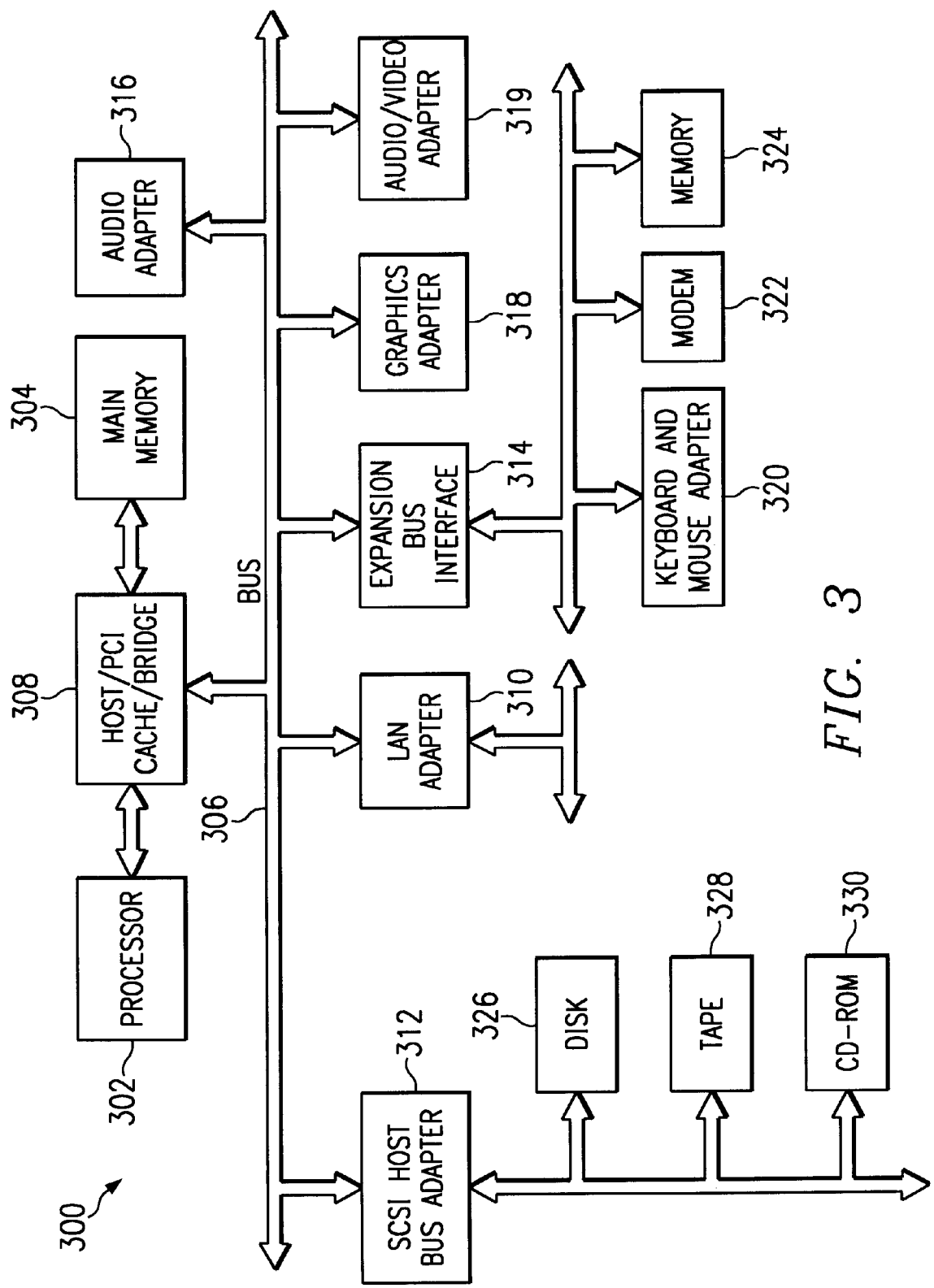
FIG. 3 is a block diagram of a data processing system in which the present invention may be implemented.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

Figure 4:
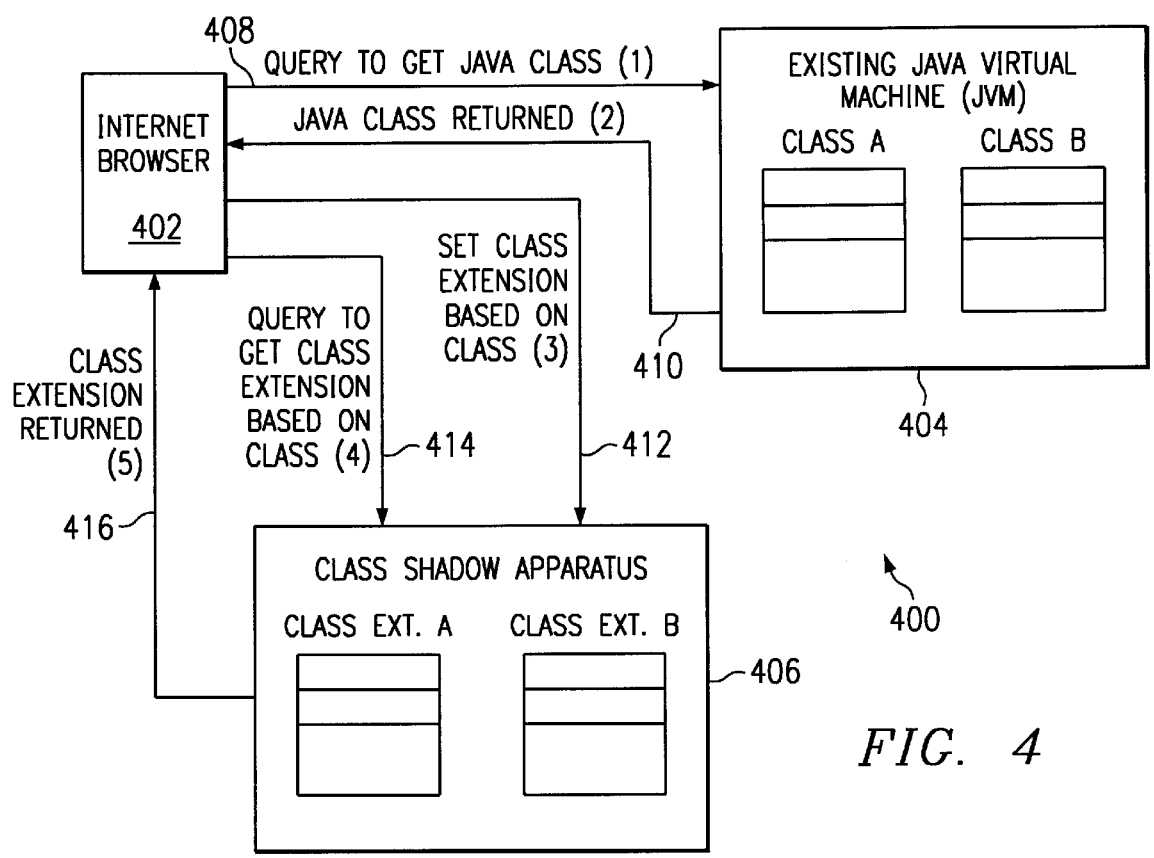
FIG. 4 is a block diagram of the present invention illustrating the creation of a class shadow apparatus outside of the JVM.

Referring to FIG. 4, a block diagram 400 is presented that illustrates both the method and the apparatus of the present invention. An internet browser 402 is coupled to a Java virtual machine (JVM) 404. The JVM 404 contains class data structures for various classes. The JVM is queried (step 408) to get the Java class information. The Java class information is returned to the browser (step 410), Next, the class extensions are set (step 412) in the class shadow apparatus 406. The class extensions are set based on the class information retrieved in step 410. During use of the class shadow apparatus 406, the apparatus 406 can be queried to get class extension information (step 414). When successfully queried, the class extensions are returned (step 416) to the browser 402.

Figure 5:
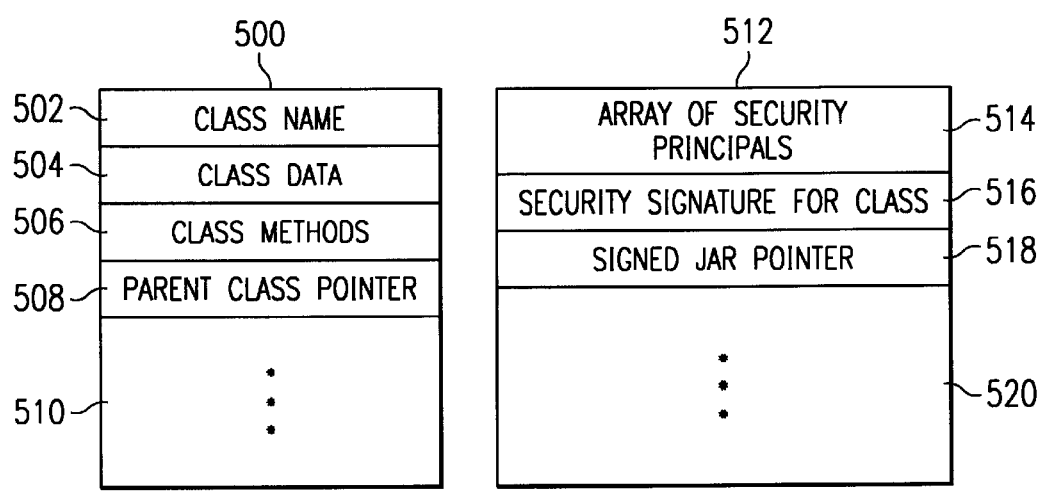
FIG. 5 illustrates the Java class data structure and the class extension data structure maintained in the shadow apparatus.

FIG. 5 illustrates the data structures in both the 600 and in the shadow apparatus. The JVM's data structure 500 contains the class name 502, the class data 504, class methods 506, and the parent class 503 as well as additional data 510. The class extension data structure 512 contains an array of security principals 514, the security signature for the class 516, and a pointer to the signed Java Archive (JAR) file that the class was stored in, as well as other data 520.

Figure 6:
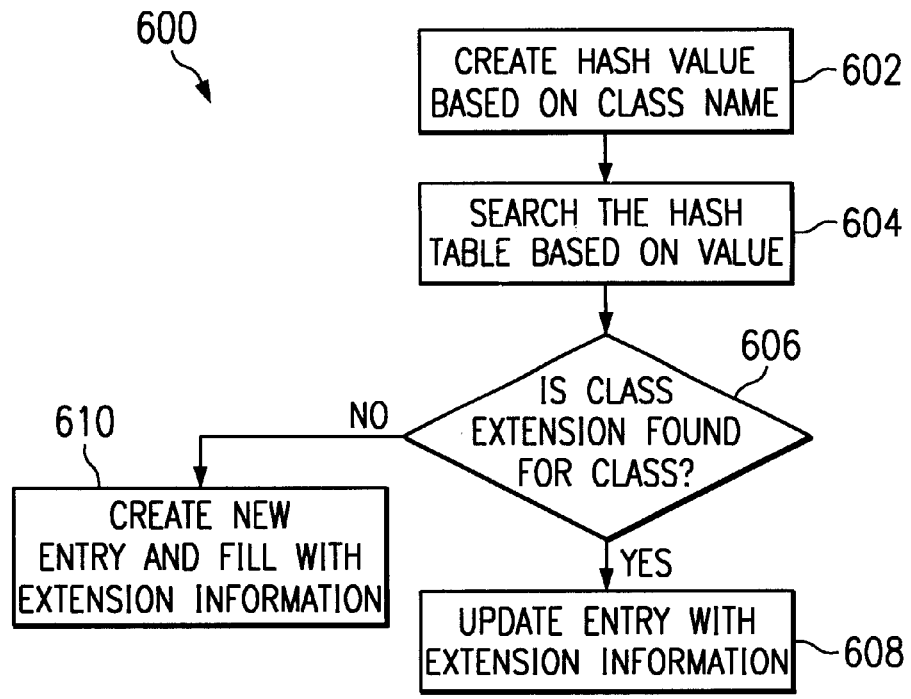
FIG. 6 is a flow chart of the method of setting a class extension in the apparatus.

FIG. 6 provides a flow chart of the method 600 of setting a class extension in the shadow apparatus. First, a hash value is set based on the class name (step 602). Next, a search is performed on a hash table based on the value (step 604). Next, the method must decide if the class extension is found for the class in question (step 606). If the class extension is found, then an updated entry is made in the hash table with the extension information (step 608). If the class extension is not found, then a new entry is created and filled with extension information (step 610).

Figure 7:
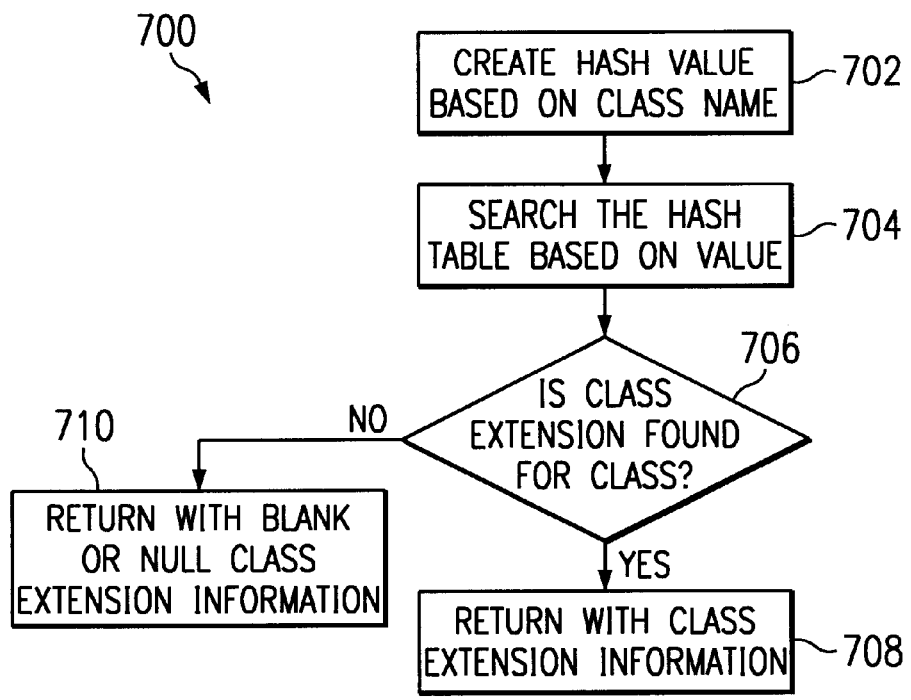
FIG. 7 is a flow chart of the method of getting a class extension in the apparatus.

FIG. 7 illustrates the method 700 of getting a class extension from the shadow apparatus. First, a hash value is created based on the class name (step 702). Next, the hash table is searched based on this value (step 704). A decision is made whether a class extension is found for that class (step 706). If so, then the class extension information is returned (step 708). If not, then blank or null class extension information is returned. (step 710).

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. An apparatus for using class extension information with a Java-enabled browser, comprising:
   (a) a shadow data structure containing one or more class extensions for one or more classes stored in a Java Virtual Machine associated with the Java-enabled browser, each of the one or more class extensions containing an array of security for a corresponding one of the one or more classes; and
   (b) means for retrieving a class extension of the one or more class extensions from the shadow data structure based on a hash of a class name of the class corresponding to the class extension.

2. The apparatus of claim 1 wherein said one or more class extensions further comprise a security signature for a corresponding class of the one or more classes.

3. The apparatus of claim 1 wherein said one or more class extensions further comprise a signed JAR pointer.

4. The apparatus of claim 1 wherein said shadow data structure resides in a memory.

5. A method for providing a class extension of a class to be executed in a virtual machine of a data processing system, the method comprising the computer-implemented steps of:
   (a) creating a hash value for a class stored in the virtual machine based on a class name of the class; and
   (b) searching a hash table based on the hash value, the hash table comprising entries with class extension information, the class extension information identifying an array of security principals for a corresponding class.

6. The method of claim 5 further comprises:
   (c) if a hash table entry is located by searching the hash table, updating the hash table entry with class extension information in response to a request to set a class extension.

7. The method of claim 5 further comprises:
   (c) if a hash table entry is not located by searching the hash table, creating a new hash table entry with class extension information in response to a request to set a class extension.

8. The method of claim 5 further comprises:
   (c) if a hash table entry is located by searching the hash table, retrieving class extension information for the class from the hash table entry in response to a request to get a class extension.

9. The method of claim 5 further comprises:
   (c) if a hash table entry is not located by searching the hash table, returning with blank or null class extension information in response to a request to get a class extension.

10. A data processing system for providing a class extension of a class to be executed in a virtual machine in the data processing system, the data processing system comprising:
    (a) creating means for creating a hash value for a class stored in the virtual machine based on a class name of the class; and (b) searching means for searching a hash table based on the hash value, the hash table comprising entries with class extension information, the class extension information identifying an array of security principals for a corresponding class.

11. The data processing system of claim 10 further comprises:

(c) updating means for updating the hash table entry with class extension information if a hash table entry is located by searching the hash table in response to a request to set a class extension.

12. The data processing system of claim 10 further comprises:

(c) creating means for creating a new hash table entry with class extension information if a hash table entry is not located by searching the hash table in response to a request to set a class extension.

13. The data processing system of claim 10 further comprises:

(c) retrieving means for retrieving class extension information for the class from the hash table entry if a hash table entry is located by searching the hash table in response to a request to get a class extension.

14. The data processing system of claim 10 further comprises:

(c) returning means for returning blank or null class extension information if a hash table entry is not located by searching the hash table in response to a request to get a class extension.

15. A computer program product for use in a data processing system for providing a class extension of a class to be executed in a virtual machine in the data processing system, the computer program product comprising:

(a) first instructions for creating a hash value for a class stored in the virtual machine based on a class name of the class; and (b) second instructions for searching a hash table based on the hash value, the hash table comprising entries with class extension information, the class extension information identifying an array of security principals for a corresponding class.

16. The computer program product of claim 15 further comprises:

(c) third instructions for updating the hash table entry with class extension information if a hash table entry is located by searching the hash table in response to a request to set a class extension.

17. The computer program product of claim 15 further comprises:

(c) third instructions for creating a new hash table entry with class extension information if a hash table entry is not located by searching the hash table in response to a request to set a class extension.

18. The computer program product of claim 15 further comprises:

(c) third instructions for retrieving class extension information for the class from the hash table entry if a hash table entry is located by searching the hash table in response to a request to get a class extension.

19. The computer program product of claim 15 further comprises:

(c) third instructions for returning blank or null class extension information if a hash table entry is not located by searching the hash table in response to a request to get a class extension.

* * * * *

UNITED STATES PATENT AND TRADEMARK OFFICE
CERTIFICATE OF CORRECTION

PATENT NO. : 6,339,829 B1
DATED : January 15, 2002
INVENTOR(S) : Beadle et al.

It is certified that error appears in the above-identified patent and that said Letters Patent is hereby corrected as shown below:

<u>Column 5,</u>
Line 31, please delete "600" and insert -- JVM --.

Signed and Sealed this

Twenty-first Day of May, 2002

Attest:

Attesting Officer

JAMES E. ROGAN
*Director of the United States Patent and Trademark Office*